Oct. 4, 1949.  C. D. PETERSON ET AL  2,483,841
SHIFTABLE SYNCHRONIZING CLUTCH MEMBER
Filed Jan. 19, 1946
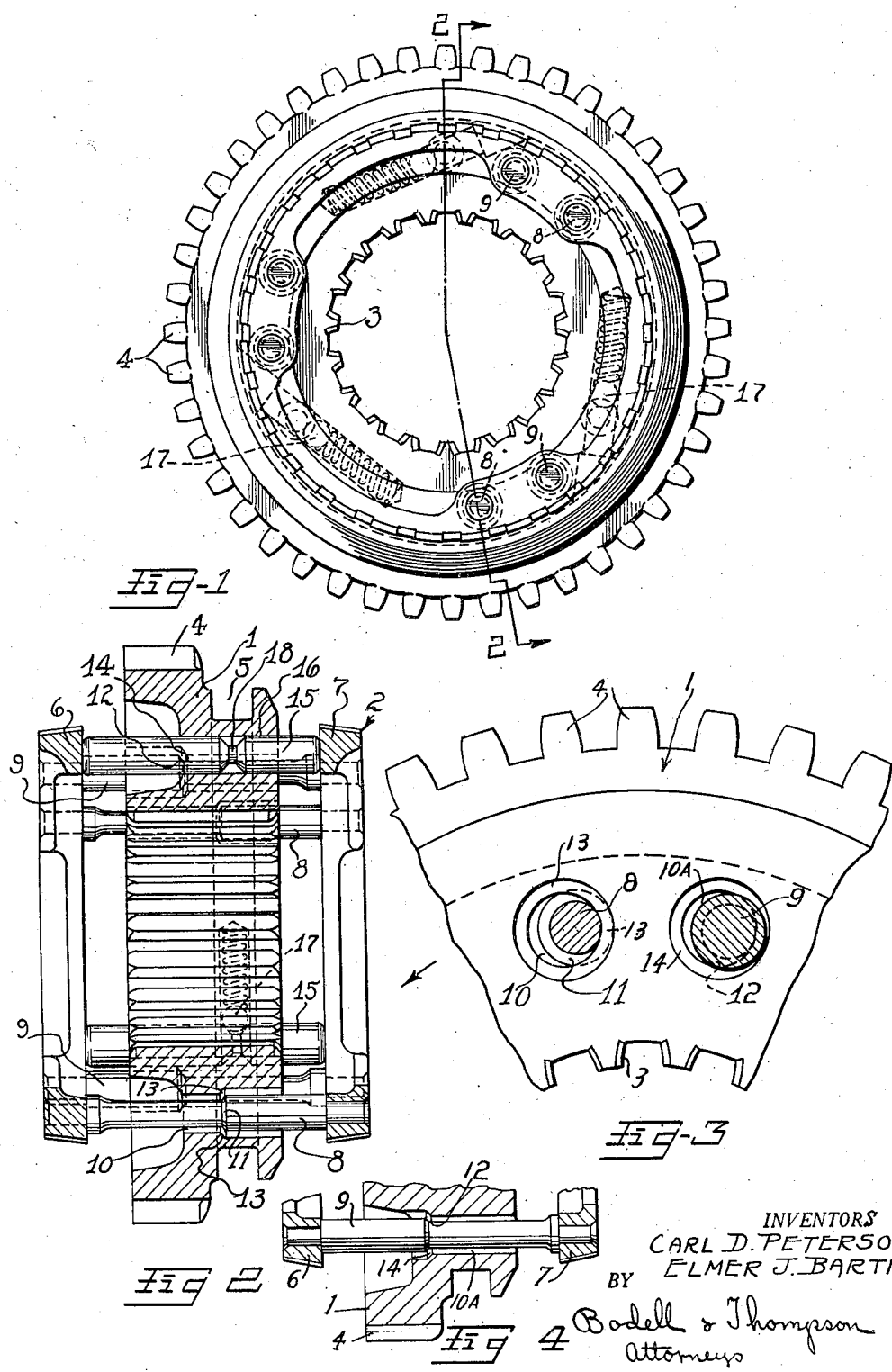
INVENTORS
CARL D. PETERSON
ELMER J. BARTH
BY Bodell & Thompson
Attorneys Patented Oct. 4, 1949

2,483,841

UNITED STATES PATENT OFFICE 2,483,841

SHIFTABLE SYNCHRONIZING CLUTCH MEMBER

Carl D. Peterson and Elmer J. Barth, Toledo, Ohio, assignors to Dana Corporation, Toledo, Ohio, a corporation of Virginia Application January 19, 1946, Serial No. 642,168

4 Claims. (Cl. 192—53)

1

This invention relates to synchronizing clutches, and particularly to double synchronizing clutches, the shiftable member of which is shiftable in opposite directions from neutral into different speed ratios or gear trains, and has for its object a simple, compact and economical construction of the shiftable member, in which the friction section consists of two friction rings at the ends thereof connected by rods extending through openings in the toothed section to which the shifting effort is applied, the openings and the rods having blocking shoulders coacting cam fashion, with the shoulders on some of the rods facing in one direction to block the shift in one direction from neutral and the shoulders on the other rod facing in the opposite direction to block when the shift is made in the opposite direction from neutral.

The invention further has for its object the arrangement of yielding coupling means between the toothed and friction sections, which coupling means includes push rods slidable in the toothed section and thrusting at its ends against, but unattached to, the friction rings at the ends of the friction section, and poppets coacting with the push rods.

The invention consists in the novel features and in the combinations and constructions hereinafter set forth and claimed.

In describing this invention, reference is had to the accompanying drawings in which like characters designate corresponding parts in all the views.

Figure 1 is an elevation or face view of this shiftable synchronizing clutch member.

Figure 2 is a sectional view taken on the plane of line 2—2, Figure 1, one of the rods of a pair connecting the friction rings, being shown in elevation.

Figure 3 is an enlarged fragmentary face view of the toothed section showing the relative location of the rods of each pair of rods between the friction rings of the friction section.

Figure 4 is a fragmentary sectional view of parts seen in Figure 2 showing the other rod of the pair connecting the friction rings.

Conventional synchronizing clutches include a shiftable member having a toothed or jaw section and a friction section, the member being shiftable in one direction from neutral to clutch into one speed ratio or gear train, and in another direction into another gear train. The two sections have a limited relative rocking movement and blocking shoulders which engage and block when the speeds of the two parts to be clutched

2 together are different, but which will unblock upon the application of a slight shifting-in force, when the speeds are synchronized. This invention relates to a simple and economical construction by which these operations are accomplished.

In the illustrated embodiment of the invention, 1 designates the toothed section, and 2 the friction section. The toothed section 1 is shown as provided with a splined bore 3 for slidably mounting upon a shaft, not shown. The ends of the splines 3 form clutch teeth coacting with complemental clutch teeth on gears or other elements to be positively clutched through said shaft. The toothed section 1 is also shown as provided with peripheral gear teeth 4. It is also provided with suitable means, as a groove 5 for coacting with a shifting fork.

The friction section 2 includes friction rings 6, 7 at its opposite ends, that is, rings provided with friction clutch surfaces, usually conical, and rods connecting said rings. The rods are preferably arranged in pairs, and 8 and 9 designate the rods of each pair. The rods 8 and 8 extend through openings or passages 10, 10A in the web of the toothed section 1, the passages and rods being shaped to permit the limited relative rocking movement of the two sections 1, 2 and the rods being provided with blocking shoulders 11 and 12, respectively, facing in opposite directions. In the illustrated construction, these oppositely facing shoulders are provided on the rods of each pair. The shoulders 11 effect the blocking when the shift is made to the right (Figure 2), and the shoulders 12 effect the blocking when the shift is made to the left. These shoulders coact with complemental internal shoulders 13 and 14 in the companion openings 10, 10A, either or both coacting shoulders being beveled, in order to coact cam fashion. As the operation of blocking shoulders in synchronizing clutches is well known, it is thought that further description of the operation thereof is unnecessary.

In conventional synchronizing clutches, yielding coupling means is provided between the toothed and friction sections, so that when the shifting effort is applied to the toothed section, the two sections first shift as a unit until one or the other of the friction rings is stopped in its shifting movement, and then further effort shifts the toothed section relative to the friction section. While the speeds are widely different, considerable effort is required to dislodge the blocking shoulders. However, as the speeds synchronize, the shoulders dislodge with little effort.

The yielding coupling means here shown consists of floating or push rods 15 slidably mounted in transverse bores 16 in the web of the toothed clutch section 1, these thrusting at their ends against the friction rings 6, 7 but being unattached thereto, and spring-pressed poppets coacting cam fashion with the push rods 15. 17 designate the spring-pressed poppets, these being located in bores in the toothed section 1 or the web thereof and extending in a general tangential direction relative to a circle concentric with the axis of the clutch and intersecting the rod 15, the poppets coacting with notches 18 in the push rods 15. The poppets are usually balls and the notches complete grooves formed with beveled side walls so that when sufficient shifting-in force or pressure is applied, the balls are cammed out of the grooves and permit the toothed section to be shifted axially relatively to the friction section.

This construction and assembly of the sections of the shiftable members of synchronizing clutches is particularly simple, strong and economical compared with conventional structures.

What we claim is:

1. A shiftable member for double synchronizing clutches shiftable in opposite directions from neutral into different gear trains, including a toothed section and a friction section, the friction section having friction rings at opposite ends therefor and rods connecting said rings and extending through openings in the toothed section, the openings being of such size as to permit relative limited rocking movement of the sections, said openings and the rods having coacting blocking shoulders, and yielding means between the sections for coupling the sections together so that they initially shift as a unit until one or the other of the friction rings is shifted into clutching engagement with a complemental friction face preliminary to the clutching engagement of the toothed section, the blocking shoulders on some of said rods facing only in one direction to cooperate with complemental shoulders in said openings and in other of the rods facing in the opposite direction only.

2. A shiftable member for double synchronizing clutches shiftable in opposite directions from neutral into different gear trains, including a toothed section and a friction section, the friction section having friction rings at opposite ends thereof and rods connecting said rings and extending through openings in the toothed section, the openings being of such size as to permit relative limited rocking movement of the sections, said openings and the rods having coacting blocking shoulders, and yielding means between the sections for coupling the sections together so that they initially shift as a unit until one or the other of the friction rings is shifted into clutching engagement with a complemental friction face preliminary to the clutching engagement of the toothed section, the rods being arranged in pairs and the blocking shoulders on the rods of each pair facing in opposite directions to cooperate with complemental shoulders in said openings.

3. A shiftable member for double synchronizing clutches shiftable in opposite directions from neutral into different gear trains, including a toothed section and a friction section, the friction section having friction rings at opposite ends thereof and rods connecting said rings and extending through openings in the toothed section, the openings being of such diameter as to permit relative limited rocking movement of the sections, the rods and the walls of the openings being formed with coacting blocking shoulders, the friction section being provided with additional openings therethrough, push rods slidable in said openings and only thrusting at their ends against said friction rings and yielding coupling means between the sections coacting with said push rods.

4. A shiftable member for double synchronizing clutches shiftable in opposite directions from neutral into different gear trains, including a toothed section and a friction section, the friction section having friction rings at opposite ends thereof and rods connecting said rings and extending through openings in the toothed section, the openings being of such diameter as to permit relative limited rocking movement of the sections, the rods and the walls of the openings being formed with coacting blocking shoulders, the friction section being provided with additional openings therethrough, push rods slidable in said openings and only thrusting at their ends against said friction rings and yielding coupling means between the sections coacting with said push rods, the yielding means including spring-pressed poppets mounted in the friction section and coacting cam-fashion with the push rods, the poppets and springs extending in a generally tangential direction, relative to a circle concentric with the axis of the clutch and intersecting the push rods.

CARL D. PETERSON.
ELMER J. BARTH.

REFERENCES CITED

The following references are of record in the file of this patent:

UNITED STATES PATENTS

| Number | Name | Date |
| --- | --- | --- |
| 2,060,971 | Beringer | Nov. 17, 1936 |
| 2,101,826 | Thompson | Dec. 7, 1937 |

FOREIGN PATENTS

| Number | Country | Date |
| --- | --- | --- |
| 464,102 | Great Britain | Apr. 9, 1937 |